(12) United States Patent  
Burke

(10) Patent No.: US 6,365,046 B1  
(45) Date of Patent: Apr. 2, 2002

(54) DEVICE FOR WASTE GREASE REMOVAL

(75) Inventor: Andrew P. Burke, Marietta, GA (US)

(73) Assignee: Restaurant Technologies, Inc., Smyrna, GA (US)

( * ) Notice: Subject to any disclaimer, the term of this patent is extended or adjusted under 35 U.S.C. 154(b) by 0 days.

(21) Appl. No.: 09/569,976

(22) Filed: May 10, 2000

Related U.S. Application Data

(60) Provisional application No. 60/162,597, filed on Oct. 29, 1999.

(51) Int. Cl.$^7$ ............................................... B01D 35/02
(52) U.S. Cl. ..................... 210/416.1; 210/241; 210/184; 210/186; 210/470
(58) Field of Search ............................. 210/416.1, 186, 210/184, 241, 470; 99/408

(56) References Cited

U.S. PATENT DOCUMENTS

| | | | |
|---|---|---|---|
| 2,902,161 A | * | 9/1959 | Humbert, Jr. et al. |
| 3,279,605 A | * | 10/1966 | Shepherd |
| 3,759,388 A | * | 9/1973 | Thomason |
| 3,880,757 A | * | 4/1975 | Thomason |
| 3,914,820 A | | 10/1975 | Hankel |
| 4,052,319 A | * | 10/1977 | Friedman |
| 4,113,623 A | | 9/1978 | Koether et al. |
| 4,282,094 A | * | 8/1981 | Mitchell |
| 4,591,434 A | * | 5/1986 | Prudhomme |
| 4,702,827 A | | 10/1987 | Wenzel |
| 4,747,944 A | * | 5/1988 | George |
| 4,979,255 A | | 12/1990 | Buchnag |
| 5,609,193 A | | 3/1997 | Steckler |
| 5,908,551 A | * | 6/1999 | Onken |

* cited by examiner

Primary Examiner—Thomas M. Lithgow  
(74) Attorney, Agent, or Firm—R. Blake Johnston; Piper Marbury Rudnick & Wolfe

(57) ABSTRACT

An automated system for removing waste grease is provided employing a pump, the pump being used to draw waste grease from a grill grease trap via an intake assembly and pump the waste grease through the system, the intake assembly comprising a wand, hose, and in-line filter. The intake assembly is connected in flow communication with a suction line which guides waste grease into the pump. A pressure line then guides the pumped waste grease out of the pump and to a waste grease storage container which may be connected to the system. The suction line, pump, and pressure line are heated to prevent solidification of the waste grease as it flows through the system.

5 Claims, 2 Drawing Sheets

DEVICE FOR WASTE GREASE REMOVAL

This application claims the benefit of the filing date of copending U.S. Provisional Application No. 60/162,597 filed Oct. 29,1999.

BACKGROUND OF THE INVENTION

This invention relates generally to the field of cooking equipment, and, more particularly, to an improved, automated device for effective removal of waste grease from a grease trap, and for the transportation of the waste grease to a storage container for proper disposal.

In the restaurant industry, grill stations used for the preparation of food products typically include holding reservoirs, commonly known as grill grease traps. These grease traps contain used remains from cooking, including in particular waste grease (beef tallow), along with solid particles. The solid particles may include meat, egg, starch, or other food particles, or carbon residue that may have been scraped from the grill cooking surface. Disposal of the waste grease and solid particles that accumulate in the grease traps has been a longstanding problem for restaurants. It is environmentally harmful to dispose of the waste grease into a drain or garbage container. For this reason, rendering containers are used to dispose of the grease. Traditionally, restaurant employees would empty the waste grease in buckets. The employees would then manually carry the buckets to the back parking lot of the restaurant, where the waste grease would be poured into the rendering tank.

Previous devices have been directed to the removal of oil from fryers, usually for recycling, and therefore these devices have not addressed the problem of removing waste grease. One such device, disclosed in U.S. Pat. No. 5,609,193 to Steckler, "Automated Container for Waste Grease," is directed to the removal of spent fryer grease from a fryer for recycling. Steckler shows a tank 11 (FIG. 2) with liquid level sensors. A stationary filter pump 62 periodically transfers a portion of the spent fryer grease from a fryer 80 to the tank. When the liquid level sensors indicate that the tank has accumulated a predetermined level of spent fryer grease, a truck is coupled to the tank for removal of the grease. The container there disclosed removes the need for a back parking lot rendering tank. However, the device does not replace the manual task of removing and disposing of waste grease from grill station grease traps. For removal and transport of waste grease, the grease trap typically has to be removed from the grill station. Spillage of waste grease is a common problem, resulting in hazardous work conditions, as well as added cleanup time to remove the spilled waste grease. In addition, as waste grease cools, it solidifies, creating additional difficulties for the removal of the grease from the grease trap. A way to more effectively remove waste grease to a waste storage container is desired.

Another prior device directed to removal and recycling of oil is disclosed in U.S. Pat. No. 4,113,623, to Koether et al. Koether et al disclose a filter apparatus using an inlet/outlet hose which transports used oil from a fryer through a two-way pump to a holding tank. When it is desired to return the oil to the fryer, the pump motor is reversed, drawing the used oil through a disposable filter bag that has been submersed in the used cooking oil. The (filtered) oil is returned through the pump and to the fryer. If the filter becomes clogged due, for example, to the hardening of oil or grease that has cooled, the filter must be disconnected and cleaned or replaced.

U.S. Pat. No. 4,702,827, to Wenzel, discloses a portable filter for filtering solid material from a reusable cooking medium (oil) and returning the filtered oil to a fryer. The portable filter uses a reversible pump to draw the oil into a storage container. To return the oil to the fryer, the pump motor is reversed, drawing the return oil through a filter, which removes solid particles from the return oil and delivers the oil to the fryer. If solid oils are present in the return oil, a wrap around heater, present in the return plumbing, may be activated to melt the solids. Because the device disclosed in Wenzel is designed for filtering oil from a fryer, the device requires the use of a holding container, and the device only filters and heats the oil upon returning it to the fryer. Because of this, the portable filter of Wenzel is prone to clogs from waste grease entering the device, and it is difficult to clean.

Accordingly, it is an object of this invention to provide a waste grease removal system that is automatic, and that may be used without removing the grease trap.

A further object of this invention is to provide a waste grease removal system that will draw waste grease from a grease trap and deliver it directly to any storage container, without the need for a temporary container.

A further object of this invention is to provide a waste grease removal system that will prevent waste grease from solidifying as it passes through the system.

A further object of this invention is to provide a waste grease removal system that will prevent solid particles from damaging or causing premature wear on the pump as the pump draws the waste grease.

A further object of this invention is to provide a waste grease removal system that may be cleaned easily and thoroughly, and to provide a system that contributes to a cleaner and less hazardous workplace.

SUMMARY OF THE INVENTION

These and other useful objects are achieved by the present invention, an automated system for removing waste grease from a grease trap. The invention uses an intake assembly, or wand/hose assembly, for insertion into the grease trap. The user manipulates a wand to draw waste grease into the system, while operating an optional strainer/scooper to prevent larger solid particles from entering, the wand. A pump provides the suction for drawing the waste grease through the wand and through the intake assembly. A filter in-line with the intake assembly is employed to remove solid particles that remain in the system and prevent them from entering the pump. The filtered waste grease enters a suction line, passes the pump, and then enters a pressure line to a storage container, of the user's choosing, for removal, without needing to be initially stored in a temporary holding container within the system. To prevent solidification of the waste grease as it is drawn through the system, a heater is provided for the suction line and preferably other components of the system. Typically, the heater is in the form of heat tape, which is attached to the suction line, pump, and pressure line, though other means for heating are possible, such as pad heaters. The pump and heater are operatively coupled to a power supply, and the system may include a power switch for selective operation.

In a typical embodiment of the invention, the pump, suction line and pressure line are housed within an outer container, the outer container being covered so as to protect the inner components of the system and also to conserve heat within the lines and pump. The intake assembly and any desired storage container are connected to couplings located on front and rear walls, respectively, of the outer container. For easy cleaning, the intake assembly may be detachable from the remainder of the system for connection to a sink, or other water source, in order to flush the intake assembly.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
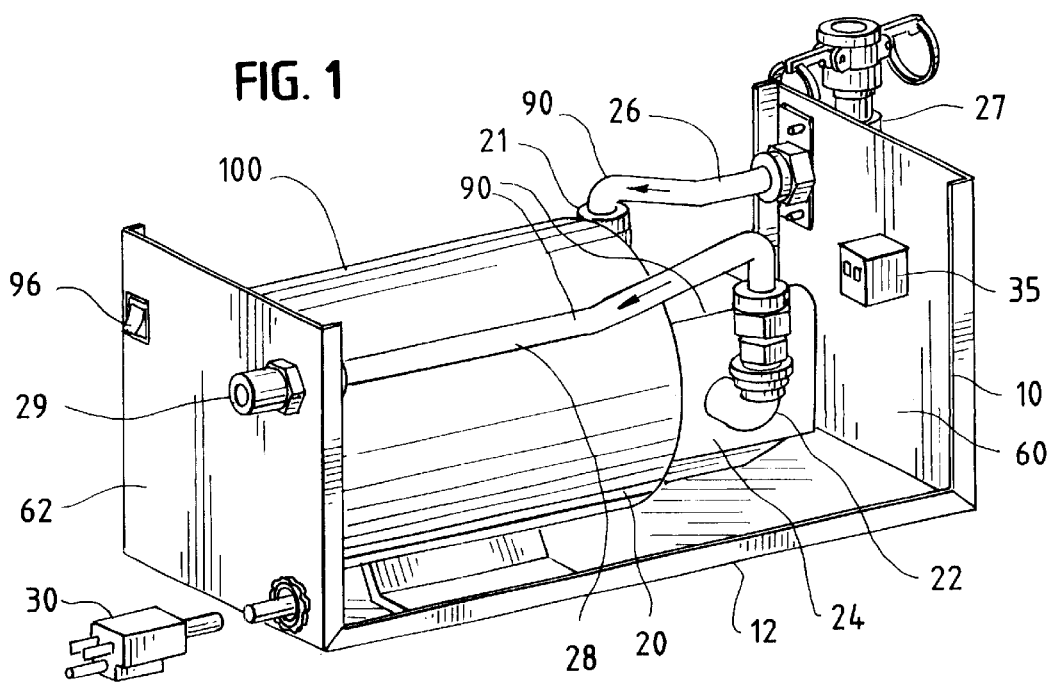
FIG.1 is a perspective view of an embodiment of the invention with the intake assembly removed and with the enclosure cover removed so as to disclose its components.
Figure 2:
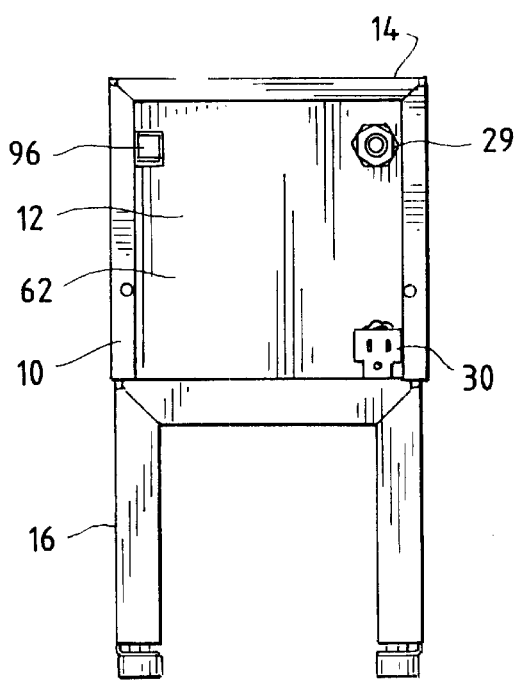
FIG.2 is a rear view of an embodiment of the invention, showing a cover for the outer container and support legs.

A device and system for the removal of waste grease from a grease trap constructed in accordance with the present invention is indicated in general at 100 in FIG.1, shown without an optional cover to allow viewing of the system. The waste grease removal system 100 may be enclosed in an outer container 10 for protection of the system. The outer container 10 may comprise an outer enclosure base 12, which preferably is covered by a cover 14 for protection of the inner components of the system and for retaining heat within the enclosed components of the system. The outer enclosure base 12 contains first and second end walls 60, 62. The outer container 10 may, but need not, rest upon a plurality of support legs 16. FIG.2 shows a rear view of an embodiment of the invention wherein the system is covered by a cover 14 and is resting on support legs 16.

The waste grease removal system requires the use of a pump 20, typically an electric vacuum pump, for the removal of waste grease from a grease trap (not shown). Preferably, the pump 20 is mounted to and housed within the outer container 10. The pump 20 contains an inlet 21 and an outlet 22, preferably at the head 24 of the pump. In one embodiment, a Viking Pump Company model #L-510-4852-502 gear pump is used. This pump is a five gallons per minute, positive displacement spur gear pump, which has been fitted with a 110V AC, ⅓ horsepower electric motor. Those skilled in the art will appreciate that various pumps may be used, so long as the pump is capable of generating sufficient suction to remove waste grease from a grease trap, and is capable of pumping the waste grease through the waste grease removal system to an outer container. The pump 20 is operatively coupled to a power supply. A power cord 30 may be connected to the pump 20 for coupling to the power supply. A power switch 35 may be connected to the system 100 and power supply for selective interruption of power, if needed.

The inlet 21 of the pump 20 is connected to and in flow communication with a suction line 26. The inlet 21 and suction line 26 guide the flow of waste grease from an intake (wand/hose) assembly 40 (FIG.4) into the pump 20. The outlet 22 of the pump 20 is connected to and in flow communication with a pressure line 28. The outlet 22 and pressure line 28 guide the flow of waste grease out of the pump 20 and toward a storage container (not shown) for storage of the waste grease. In the embodiment illustrated in FIG.1, the suction line 26 extends from the pump 20 to a first coupling 27 mounted to a first sidewall 60 of the enclosure base 12, and the first coupling 27 extends through the first sidewall 60 to the front outside face of the outer container 10 for connection with the intake assembly 40. The pressure line 28 likewise may extend from the pump 20 to a second coupling 29, the second coupling being mounted to a second sidewall 62 of the enclosure base 12, and then may extend through the second sidewall 62 to the rear outside face of the outer container 10. Preferably, the second coupling 29 is connected to a hose barb (not shown) for connection to a pressure hose which may terminate in a waste storage container (not shown).

Figure 4:
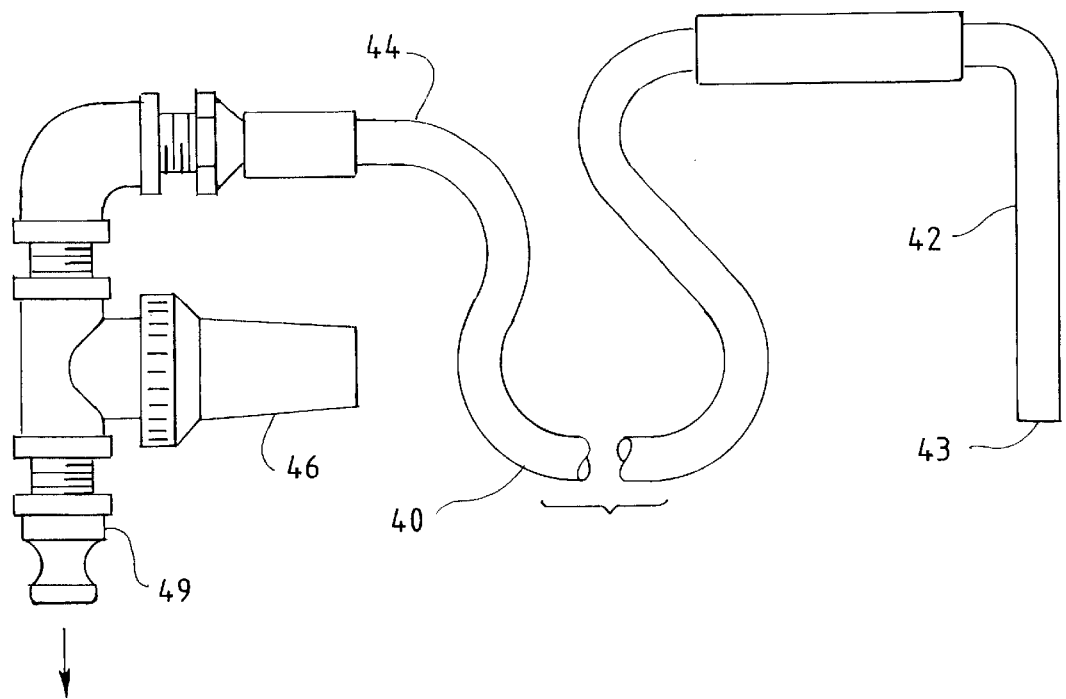
FIG.4 is an enlarged side view of an intake assembly used in an embodiment of the invention.
Figure 5:
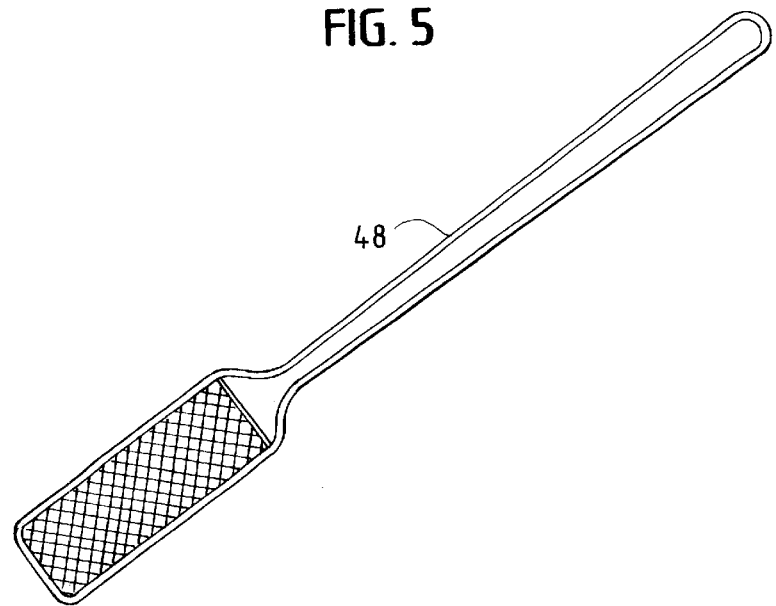
FIG.5 is a perspective view of a typical scooper/strainer used in an embodiment of the invention.

The intake assembly 40 is provided for effectively drawing the waste grease from the grease trap, and for guiding the grease to the suction line 26. A typical intake assembly is shown in FIG. 4. The intake assembly 40 comprises a wand 42, flexible hose 44, and filter 46. The wand 42, located at the distal section of the intake assembly 40, is configured to be inserted into a grease trap. By manipulating the wand within and around the grease trap while the pump 20 is in operation, a user, through the suction of the pump, transports waste grease from the grease trap into the wand via a wand opening 43, and then into the remainder of the waste grease removal system. To prevent larger solid particles, such as meat particles, egg particles, or carbon residue, from entering the wand and thereby the waste grease removal system, a user may employ a scooper 48. The scooper is preferably a scooper/strainer, such as the one shown in FIG.5. The user employs the scooper 48 together with the wand to strain or otherwise block large solid particles from the wand. In use, the scooper 48 will be placed in proximity to the wand opening 43 so as to block solid particles that otherwise may enter the wand. The wand 42 is in sequential flow communication with the hose 44 and filter 46, to allow waste grease to flow into the wand, traveling through the wand, hose, and filter. The filter 46 is configured to detain smaller particles that may have escaped the scooper and entered the intake assembly via the wand. The filter 46 is preferably, but need not be, a screen mesh filter. Additional hose or other tubing may be connected between the filter 46 and suction line 26, but its presence before the suction line is necessary in order to protect the pump 20 from solid particles which can cause premature degradation or destruction of the pump. This in-line filter 46 greatly enhances the efficacy of the present invention for removing waste grease from grill grease traps, which invariably contain solid particles.

Figure 3:
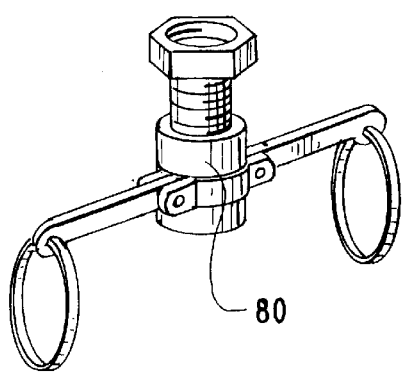
FIG.3 is a perspective view of a typical sink adapter used in an embodiment of the invention.

In a preferred embodiment, a coupling 49 is employed to connect the intake assembly 40 with the suction line 26. In the embodiment illustrated in FIG. 1, this coupling 49 connects to the mating coupling 27 located on the front outside face of the outer container 10. Preferably, the intake assembly 40 is easily disconnected from the mating coupling 27, in order to allow a sink adapter 80 to be connected to the intake assembly. A typical sink adapter used in an embodiment of the invention is shown in FIG.3.

After the waste grease has traveled through the wand 42, hose 44, filter 46, suction line 26, pump 20, and pressure line 28, the waste grease may be deposited in a waste grease storage container (not shown) coupled to the pressure line 28, preferably via the second coupling 29.

In order to prevent the waste grease from solidifying and clogging the system, a heater is employed for warming the suction line. It is also desirable that the heater be used to warm the pump 20, particularly the head of the pump, and the pressure line 28. If the pump 20, suction line 26, and pressure line 28 of the system are enclosed within the outer container 10 and covered by the cover 14, the system will retain heat. The heater, in a preferred embodiment, takes the form of electrical heat tape 90, which is wrapped around the suction line 26, pump 20, and pressure line 28, and preferably covered with aluminum foil tape. Alternate means of heating may be used as well; for example, pad heaters. The heater is connected to a power supply, via a switch 96, for selective interruption of power, if needed. Otherwise, the heater remains on continuously. The use of a heater for heating the suction line, pump, and pressure line minimizes the chances of a malfunction of the invention due to solidification, and makes the present invention particularly well suited for the removal of waste grease. Cleaning of the system is simple, as the intake assembly, suction line, pump, and pressure line are unlikely to accumulate waste grease or solid particles that may have become trapped by such accumulated waste grease within the system.

In typical operation, a user activates the pump, and inserts the wand into the grease trap. By manipulating the scooper and the wand, the user, through the suction of the pump, draws waste grease into the wand. Residual solid particles that escape the scooper also may enter the wand. The waste grease travels through the wand and hose, and is drawn through the filter, where additional solid particles are removed. Remaining in liquid form due to the action of the heater, the filtered waste grease is drawn through the suction line, and is then pumped to the pressure line, and into a waste grease storage container. While a standard waste grease storage container will preferably be used, the invented system allows for the waste grease to be transported to any container desired, such as a rendering container. The grease is not required to be initially stored in a temporary compartment within the system, as opposed to the oil recycling devices of some prior art. Waste grease is thus removed from the grease trap without having to remove the grease trap from the grilling station, or otherwise manually removing or transporting the waste grease.

After all liquid waste grease is removed from the grease trap, the user may use the scooper to scoop remaining solid particles from the trap into a garbage container (not shown). After completing the particle removal, the intake assembly may be disconnected from the first coupling, and the sink adapter may then be connected to the intake assembly for fitting to a sink, in order to allow hot water to run through the assembly and flush out remaining waste grease and trapped solid particles.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for removing waste grease from a grease trap and for disposing of the removed waste grease in a storage container, said system comprising:

a) a pump, having an inlet and an outlet;

b) a wand/hose assembly for guiding waste grease from the grease trap into the pump, the wand/hose assembly comprising a hose connected to a wand, the wand being manually operable for insertion into the grease trap, and including a filter for removing solid particles, the filter being integral with the wand/hose assembly such that the waste grease must flow through the filter before entering the inlet;

c) a suction line disposed between the inlet of the pump and the wand/hose assembly for guiding the waste grease from the wand/hose assembly into the pump;

d) a pressure line in flow communication with the outlet of the pump for guiding the waste grease out of the pump; and e) a means for heating the suction line, pump and pressure line, whereby said means for heating prevents the waste grease from solidifying as the waste grease flows through the system.

2. The system of claim 1, further comprising an outer container, wherein the outer container houses the suction line, pump and pressure line.

3. The system of claim 1, wherein the means for heating comprises heat tape operatively coupled to the suction line, pump, and pressure line.

4. The system of claim 1, further comprising a scooper in communication with the entrance of the wand/hose assembly, said scooper is adapted to filter the waste grease by straining solid particles and preventing the solid particles from entering the system.

5. A system for removing waste grease from a grease trap and for disposing of the removed waste grease in a storage container, the system comprising:

a) a pump having an inlet and an outlet;

b) an intake assembly removably connected to the pump inlet, said intake assembly comprising a hose connected to a wand for retrieving waste grease from a grease trap and a filter in communication with the hose for removing solid particles therefrom;

c) an adapter adapted to removably connect said intake assembly to a sink for flushing waste grease from the intake assembly; and d) a pressure line connected to the pump outlet for guiding waste grease out of the pump into the storage container.

* * * * *